United States Patent [19]

Stern

[11] Patent Number: 6,146,570
[45] Date of Patent: Nov. 14, 2000

[54] PROCESS FOR PRODUCING EXTRUDED HYDROCOLLOID GRANULES

[75] Inventor: Alan Joseph Stern, Powell, Ohio

[73] Assignee: Rhodia Inc., Cranbury, N.J.

[21] Appl. No.: 09/265,008

[22] Filed: Mar. 9, 1999

Related U.S. Application Data

[60] Provisional application No. 60/078,846, Mar. 20, 1998.

[51] Int. Cl.$^7$ ........................................................ B29B 9/06
[52] U.S. Cl. ................ 264/141; 264/177.11; 264/331.12
[58] Field of Search ................................. 264/141, 176.1, 264/177.11, 330, 331.11, 331.12

[56] References Cited

U.S. PATENT DOCUMENTS

| | | |
|---|---|---|
| 4,065,289 | 12/1977 | Judd . |
| 4,453,979 | 6/1984 | DeMasi et al. ......................... 106/188 |
| 5,047,079 | 9/1991 | Djafar et al. . |
| 5,372,989 | 12/1994 | Geigle et al. . |
| 5,474,971 | 12/1995 | Sandell . |
| 5,571,522 | 11/1996 | Munson et al. ......................... 424/410 |
| 5,869,029 | 2/1999 | Graff-Anderson et al. .............. 424/52 |

OTHER PUBLICATIONS

Chem Abstracts, Issue 26, 1996, p. 27, 125: 308924e Alternative granulation technique: melt granulation.
Application for Canadian Patent (A1) 2,101,669 Filed Jul. 30,1993.
PCT Application WO 93/25074 Filed Jun. 10, 1993.
PCT Application WO 93/25081 Filed Jun. 10, 1993.

*Primary Examiner*—Jan H. Silbaugh
*Assistant Examiner*—Kenneth M. Jones
*Attorney, Agent, or Firm*—John A. Shedden

[57] ABSTRACT

A hydrocolloid product having improved dispersibility and wettability characteristics in aqueous medium is provided by dry blending in a heated state the hydrocolloid powder particles with molten, normally solid nonionic surfactant. The heated mixing state is at a temperature greater than the melting temperature of the solid nonionic surfactant. After suitable mixing, the resulting mixture of surfactant-coated powder particles is extruded to produce granules of the hydrocolloid-nonionic surfactant mixture, which granules are cooled to below the melting temperature of the nonionic surfactant to provide a readily water dispersible, readily wettable hydrocolloid product.

9 Claims, No Drawings

PROCESS FOR PRODUCING EXTRUDED HYDROCOLLOID GRANULES

This application Ser. No. 09/265,008 claims the benefit of provisional application 60/078,846, filed Mar. 20, 1998.

FIELD OF THE INVENTION

This invention relates to hydrocolloids with improved wettability characteristics and particularly guar compositions with improved dispersibility and solubility in aqueous mediums.

BACKGROUND OF THE INVENTION

Hydrocolloids are hydrophilic colloidal material used particularly in food, pharmaceutical, coating, mining, oil field, paint, textile, paper, agricultural and personal care product industries as emulsifying, thickening and gelling agents. They readily absorb water, thus increasing viscosity and imparting smoothness and body texture to products. Among the hydrocolloids used are natural types such as plant exudates such as gum arabic, seaweed extracts such as agar, plant seed gums or mucilages such as guar gum, cereal grains such as starches, fermentation gums such as dextran and animal products such as gelatin and semisynthetic types such as modified celluloses and modified starches. The most significant hydrocolloid has been guar gum.

These hydrocolloids are generally available as powders. In use these powders are generally mixed with water for further use in producing a wide variety of products. However, the ability of these hydrocolloids to readily absorb water has lead to a wide variety of problems, particularly in regard to the wettability of the hydrocolloid powders in water. For example, when the powders are added in bulk to water the powder tends to float on the top of the water and clump, gel or aggregate into a mass rather than be uniformly dispersed in the water. That is, the hydrocolloid gels very rapidly before it is properly dispersed in the aqueous medium and produces the gelling or clumping of the powdered hydrocolloid.

It is therefore an object of the invention to provide a hydrocolloid product with improved dispersibility and wettability characteristics and which avoids or substantially eliminates the gelling or clumping problems associated with its dissolution in water. A further object of this invention is to provide a process for obtaining such hydrocolloid product.

BRIEF SUMMARY OF THE INVENTION

A hydrocolloid product having improved dispersibility and wettability characteristics in aqueous medium is provided by dry blending in a heated state the hydrocolloid powder particles with molten, normally solid nonionic surfactant. The heated mixing state is at a temperature greater than the melting temperature of the solid nonionic surfactant. After suitable mixing the resulting mixture of surfactant-coated powder particles is extruded to produce granules of the hydrocolloid-nonionic surfactant mixture, which granules are cooled to below the melting temperature of the nonionic surfactant to provide a readily water dispersible, readily wettable hydrocolloid product.

DETAILED DESCRIPTION OF THE INVENTION

The invention is applicable to any suitable hydrocolloid, and particularly to guar and modified guar powders, such as alkoxylated guar powders, especially as JAGUAR HP8 available from Rhodia, Inc.

The mixture of powdered hydrocolloid and normally solid nonionic surfactant in the resulting granular product will generally comprise at least about 70% by weight, more preferably about 75% to about 85%, of the hydrocolloid and from about 10% to about 20% by weight, preferably about 15% to 20%, and more preferably from about 14% to 18%, of normally solid nonionic surfactant based on the weight of composition.

The composition may comprise additional ingredients that may be required or optional for a particular end use application of the hydrated hydrocolloid. For example, when used as an adjuvant in acidic herbicidal or pesticidal formulations such as in ROUNDUP formulations it is necessary or desirable to adjust the aqueous solution close to neutral pH so that the hydrocolloid will not hydrate too rapidly. For this purpose a pH adjusting basic salt such as sodium carbonate may be present in a suitable amount, generally in an amount up to about 7% by weight.

In an unduly alkaline environment the hydrocolloid will hydrate too slowly and therefore a suitable acidic component may be present, such as citric, acetic or fumaric acid and the like, in an amount up to about 3% by weight.

Also, it is desirable to include a suitable antifoam agent, such as a silicone antifoam agent like the starch encapsulated silicone antifoam agent RHODORSIL EP-6703, generally in an amount up to about 1% by weight, preferably about 0.3% to 0.8% by weight.

Other optional ingredients, such as for example, dyes, colorants, pH indicators and the like may also be employed in the formulations of this invention.

The normally solid nonionic surfactant useful in the process and product of this invention are those that are water-soluble solids or of a hard, non-tacky wax consistency at room temperature or above, preferably above 90° F. (32° C.) and most preferably those solid at 120° F. (49° C.).

As examples of the solid nonionic surfactants that may be used in this invention there may be mentioned, for example:

A) Amides such as:

i) Alkanolamides of the formula—

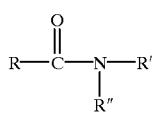

wherein R' and R" each can be —H, —CH$_2$CH$_2$OH, or

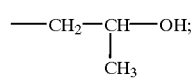

ii) ethoxylated alkanolamides of the formula—

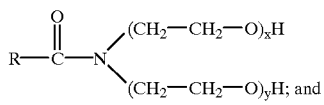

and iii) ethylene bisamides of the formula—

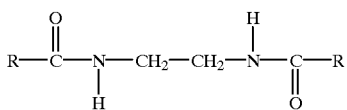

B) Esters such as:

i) fatty acid esters of the formula—

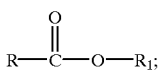

ii) glycerol esters of the formula—

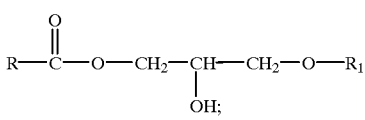

iii) ethoxylated fatty acid monoesters of the formula—

iv) sorbitan esters of the formula—

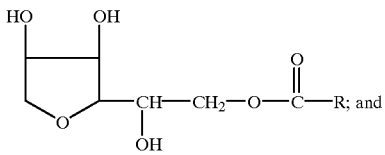

v) ethoxylated sorbitan esters of the formula—

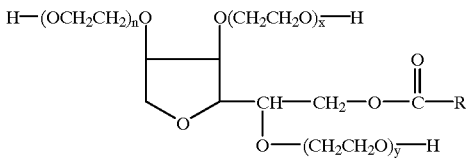

C) Ethoxylates such as:

i) alkylphenol ethoxylates of the formula—

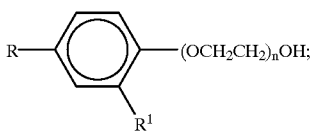

ii) alcohol ethoxylates of the formula—

iii) tristyrylphenol ethoxylates of the formula—

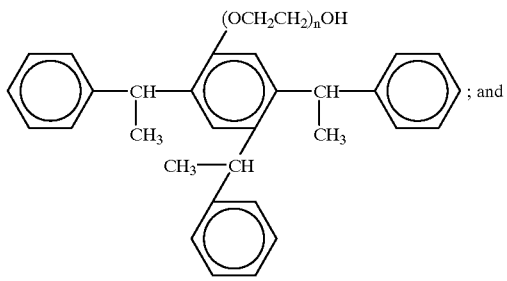; and iv) mercaptan ethoxylates of the formula—

D) End-capped and EO/PO block copolymers such as:

i) alcohol alkoxylates of the formula—

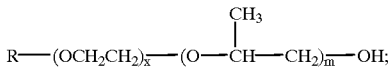

ii) ethylene oxide/propylene oxide block copolymers of the formula—

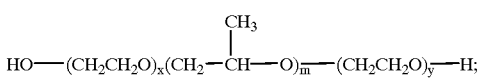

iii) copolymers of the formula—

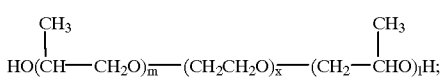

iv) chlorine capped ethoxylates of the formula—

; and v) tetra-functional block copolymers of the formula—

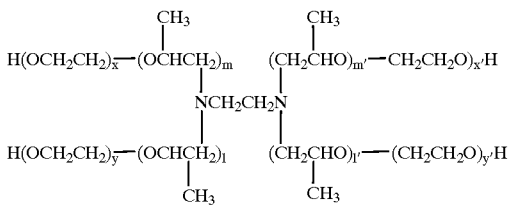

or

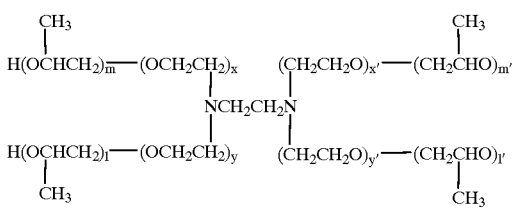

wherein

R is a fatty alkyl group, preferably a $C_6$–$C_{22}$ fatty alkyl group, most preferably a $C_8$–$C_{18}$ fatty alkyl group;

$R_1$ is —H or a fatty alkyl group, preferably —H or a $C_6$–$C_{22}$ fatty alkyl group, most preferably —H or a $C_8$–$C_{18}$ fatty alkyl group;

x, x', y, y' and n are each independently moles of ethylene oxide, preferably 1 to 300; most preferably 1 to 150; and m, m', l and l' are each independently moles of propylene oxide, preferably 1 to 300; most preferably 1 to 150;

with the proviso that the surfactant is a solid at room temperature (24° C.), and preferably a solid at 50° C.

Mixture of one or more of the surfactants may also be used. As examples of preferred solid surfactants useful in this invention there may be mentioned the nonionic long chain linear alcohol ethoxylate surfactant RHODASURF TB-970, the nonionic EO/PO/EO block copolymer ANTAROX F-108, the tristyrylphenol ethoxylate (150) TSP-150, and the dinonylphenol ethoxylate (150) IGEPAL DNP-150, wherein EO is ethylene oxide and PO is propylene oxide.

Although the invention finds applicability to a wide range of hydrocolloids such as gum arabic, agar, guar gum, cereal grains or starches, dextrans and modified celluloses and starches, it is particularly applicable to guar gum and modified guar gums such as alkoxylated guar gum, e.g., the propoxylated guar gum JAGUAR HP-8 or JAGUAR HP-120 from Rhodia, Inc.

In the process of this invention the dry ingredients other than the normally solid surfactant are blended or mixed together in a suitable mixing vessel to form an essentially uniform mixture thereof. In a separate vessel or container the normally solid nonionic surfactant is heated to a temperature above its melting point and the molten surfactant is then introduced into a heated mixture of the dry ingredients by any suitable means, such as by spraying, with suitable intense mixing or blending to coat the hydrocolloid powder and other dry ingredient particles.

The heated coated powder formulation can be fed into a suitable extruder and the surfactant coated particle mixture extruded through the extruder and extruder die as warm pellets whereupon the extruded hydrocolloid granules are cooled to below the solidification point of the molten surfactant binder.

The process is exemplified by the following illustrative, but non-limiting, examples.

EXAMPLE 1

The following process produces extruded guar granules for use as an agricultural spray adjuvant.

Equipment

High intensity heated mixer for blending dry materials, such as a Littleford mixer.

LCI twin dome extruder, alternately LCI "EXD" type extruder.

Fluid Bed dryer or other cooling apparatus.

The overall process is comprised of three parts:

1. The powders are coated with molten surfactant.
2. The warm blend of powder and surfactant is extruded to form soft granules.
3. The soft granules are hardened by cooling, using a fluid bed dryer run with ambient air.

The mixing process is accomplished by charging a jacketed Littleford mixer, equipped with high intensity choppers and an internal spray assembly with the required amount of guar gum, soda ash, and antifoam. While mixing, the material is heated to 130° F. The surfactant(s) are combined in the appropriate ratio in a steam jacketed vessel on a load cell and equipped with a mixer capable of blending the molten surfactant(s). A suitable pump and heat-traced line is used to pump the molten surfactant(s) from the melting vessel to the Littleford spray system. After melting and blending the surfactant(s) at 140 to 150° F. (61° to 67° C.), the molten surfactant(s) are introduced to the Littleford mixer by pumping through the spray system while intensely blending the pre-warmed powders. Batch time is about 20–30 minutes, depending on steam pressure and other factors.

The extrusion step is readily accomplished provided that the blended feed to the extruder is maintained between about 130° and 145° F. (55° and 63° C.). Suitable extruders include LCI Corp. Twin Dome extruder or “EXD” series extruders. The die opening should be 1.2 to 1.5 mm. As the granules exit the extruder they are warm and easily deformed. If allowed to accumulate in this state, they will lose their integrity, and will no longer be discreet granules.

To complete the process, the newly formed, soft granules are cooled to below the solidification point of the molten surfactant binders. Optimally, the granules should be reduced to ambient air temperatures. The recommended method to achieve this is by using an unheated fluid bed dryer. No weirs are needed in the fluid bed. The granules enter the fluid bed directly from the extruder and cool rapidly if gently fluidized with ambient air. Upon exiting the dryer, the product is passed through a coarse screen (about 8 mesh) to remove any lumps or granule agglomerates. After screening, the granules are packaged.

Formulation Examples 2 to 13

The invention is further illustrated by the following formulations which are extruded into granules in accordance with the procedure described in Example 1 in which the percentages are percent by weight.

| FORMULATIONS | % |
|---|---|
| <u>Formulation 2</u> | |
| Jaguar HP-8 (guar) | 75 |
| Sodium carbonate (anhydrous powder) | 9 |
| Rhodasurf TB-970 | 13 |
| Antarox F-108 | 2.5 |
| Rhodorsil EP-6703 | 0.5 |
| <u>Formulation 3</u> | |
| Jaguar HP-8 (guar) | 75 |
| Sodium carbonate (anhydrous powder) | 7 |
| Rhodasurf TB-970 | 13 |
| Antarox F-108 | 3 |
| phenolphthalein | 2 |
| <u>Formulation 4</u> | |
| Jaguar HP-8 (guar) | 75 |
| Soda ash (lite) | 6.5 |
| Rhodasurf TB-970 | 14.5 |
| Antarox F-108 | 3 |
| phenol red | 0.5 |
| Rhodorsil EP-6703 | 0.5 |
| <u>Formulation 5</u> | |
| Jaguar HP-8 (guar) | 80 |
| Sodium carbonate (anhydrous powder) | 7 |
| Rhodasurf TB-970 | 8.5 |
| Antarox F-88 | 3 |
| Rhodorsil EP-6703 | 0.25 |
| Fumaric acid, granular | 1.25 |

-continued

| FORMULATIONS | % |
|---|---|
| Formulation 6 | |
| Jaguar HP-8 | 75 |
| "TSP-150" | 10 |
| sodium phosphate, dibasic | 15 |
| Formulation 7 | |
| Uniguar 200 (guar) | 85 |
| Igepal DNP-150 | 15 |
| Formulation 8 | |
| Jaguar HP-120 | 85 |
| DNP-150 | 10 |
| Rhodasurf TB-970 | 5 |
| Formulation 9 | |
| Hydroxyethyl cellulose (Aqualon HEC) | 81.5 |
| Antarox F-108 | 5.5 |
| Rhodasurf TB-970 | 13 |
| Formulation 10 | |
| Carrageenan (Viscarin SD 389) | 85 |
| Antarox F-108 | 5 |
| Igepal DNP-150 | 10 |
| Formulation 11 | |
| Jaguar HP-8 (non COS grade guar) | 75 |
| Rhodasurf TB-970, flaked surfactant | 14.3 |
| Antarox F-108, flaked surfactant | 3 |
| Soda Ash, lite | 7 |
| Rhodorsil EP-6703 antifoam | 0.7 |
| Formulation 12 | |
| Jaguar HP-8 | 75 |
| Soda ash, lite | 7 |
| Antarox F-108 | 17.3 |
| Rhodorsil EP-6703 | 0.7 |
| Formulation 13 | |
| Jaguar HP-8 | 75 |
| Soda Ash, lite | 7 |
| Rhodasurf TB-970 | 17.3 |
| Rhodorsil EP-6703 | 0.7 |

Test Procedure for Dispersion of Hydrocolloids

In a 600 ml Griffin beaker is placed 500 ml of tap water at 15° C. and a magnetic stirbar. The beaker is placed on a stir plate, such as a VWR Dyla Dual, and stirred at a rate of 55 rpm. A one gram sample of the test substance (granules of the formulations or comparative hydrocolloid powders) is added all at once to the center of the water surface. The time required to fully disperse the test substance (granule or powder) is measured with a stopwatch and recorded. In cases in which essentially no dispersion has occurred after six minutes, the test is terminated. The test sample amounts were normalized so that each test sample contained one gram of hydrocolloid "active". The effect of acids and bases on the dispersion rate was observed in some tests by adding to the water one-half percent by weight of sodium carbonate (soda ash) or acetic acid prior to adding the test substance.

Note: No attempt was made to measure the "hydration time" or viscosity after complete hydration.

| Test Material | Sample Weight (g) | Dispersion Time (sec) | Acetic Acid/ Soda Ash, 0.5% |
|---|---|---|---|
| Uniguar 200* | 1.00 | >6:00 | — |
| Uniguar 200* | 1.03 | >6:00 | acetic acid |
| Jaguar HP-8 | 1.00 | 0:49 | — |
| Jaguar HP-8 | 1.02 | >6:00 | acetic acid |
| Jaguar HP-120 | 1.00 | 0:18 | — |
| Jaguar HP-120 | 1.00 | 0:22 | — |
| Aqualon HEC | 1.00 | 0:19 | — |
| Aqualon HEC | 1.00 | 0:19 | acetic acid |
| Viscarin SD389 | 1.00 | >6:00 (essentially infinite) | — |
| Viscarin SD389 | 1.01 | 2:50 | soda ash |
| Formulation 7 | 1.20 | 0:09 | — |
| Formulation 3 | 1.33 | 0:07 | — |
| Formulation 4 | 1.33 | 0:08 | — |
| Formulation 12 | 1.33 | 0:08 | — |
| Formulation 3 | 1.32 | 0:09 | acetic acid |
| Formulation 13 | 1.33 | 0:09 | — |
| Formulation 2 | 1.35 | 0:07 | acetic acid |
| Formulation 2 | 1.30 | 0:09 | — |
| Formulation 8 | 1.14 | 0:16 | acetic acid |
| Formulation 8 | 1.16 | 0:04 | — |
| Formulation 11 | 1.35 | 0:07 | — |
| Formulation 9 | 1.23 | 0:06 | — |
| Formulation 9 | 1.25 | 0:09 | acetic acid |
| Formulation 10 | 1.18 | 0:45 | soda ash |
| Formulation 10 | 1.3 | >6:00 | — |

*Underivatized guar gum

The results demonstrate the significantly increased dispersibility (i.e., decrease in dispersion time) with the extruded granulates of the Formulations of this invention compared to underivatized guar gum (Unigar 200), derivatized guar gum (Jaguar HP-8 and Jaguar HP-120), hydroxyethyl cellulose (Aqualon HEC) and carrageenan (Viscaren SD389).

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. A process for preparing readily dispersible, readily wettable hydrocolloid granules comprising:
   (1) providing a water soluble nonionic surfactant that is a solid at room temperature or above;
   (2) melting said solid surfactant to a molten state and mixing the molten surfactant with particles of powdered hydrocolloid in a heated state to coat the hydrocolloid powder;
   (3) extruding the surfactant coated hydrocolloid powder formulation to produce granules thereof; and
   (4) cooling the extruded granules to below the solidification temperature of the surfactant,
      wherein said hydrocolloid is a guar and the guar comprises from about 75% to about 85% by weight of the formulation.

2. The process of claim 1 wherein the molten surfactant is sprayed onto heated particles of powdered guar.

3. The process according to claim 2 wherein the nonionic surfactant is a solid at 90° F.

4. The process according to claim 2 wherein the nonionic surfactant is a solid at 120° F.

5. The process according to claim 2 wherein the surfactant is a long chain linear alcohol ethoxylate, a non-ionic EO/PO/EO block copolymer, a tristyrylphenol ethoxylate, a dinonylphenol ethoxylate and mixtures thereof.

6. The process according to claim 2 wherein the nonionic surfactant component comprises from about 14 to about 18% by weight of the formulation.

7. The process according to claim 2 wherein the guar is a propoxylated guar gum, and the nonionic surfactant is selected from the group consisting of a long chain linear alcohol ethoxylate, a nonionic EO/PO/EO block copolymer and mixtures thereof.

8. The process according to claim 7 wherein the formulation additionally comprises up to about 1% by weight of an antifoam agent.

9. The process according to claim 8 wherein the formulation additionally comprises up to about 7% by weight sodium bicarbonate.

* * * * *